J. A. HILL.
GEARING.
APPLICATION FILED JULY 15, 1913.

1,104,893.

Patented July 28, 1914.

Witnesses
Chas. W. Stauffiger
Anna M. Dore

Inventor
Joshua A. Hill,

By Barthel & Barthel
Attorneys

UNITED STATES PATENT OFFICE.

JOSHUA A. HILL, OF ESSEX, ONTARIO, CANADA, ASSIGNOR OF ONE-HALF TO GEORGE W. ROGERS, OF ESSEX, CANADA.

GEARING.

1,104,893.  Specification of Letters Patent.  Patented July 28, 1914.

Application filed July 15, 1913. Serial No. 779,226.

*To all whom it may concern:*

Be it known that I, JOSHUA A. HILL, a subject of the King of England, residing at Essex, in the county of Essex and Province of Ontario, Dominion of Canada, have invented certain new and useful Improvements in Gearing, of which the following is a specification, reference being had therein to the accompanying drawings.

This invention relates to improvements in driving hubs for motor cycles and its object is to provide a very simple and compact construction so arranged that the wheel may run freely independently of the driving mechanism, and the driving mechanism may run while the wheel is at rest, thus permitting, in motor cycle construction, the starting of the engine before the vehicle is set in motion.

A further object of the invention is to provide a simple and efficient friction drive mechanism and to provide certain other new and useful features in the construction and arrangement of parts.

Figure 1:
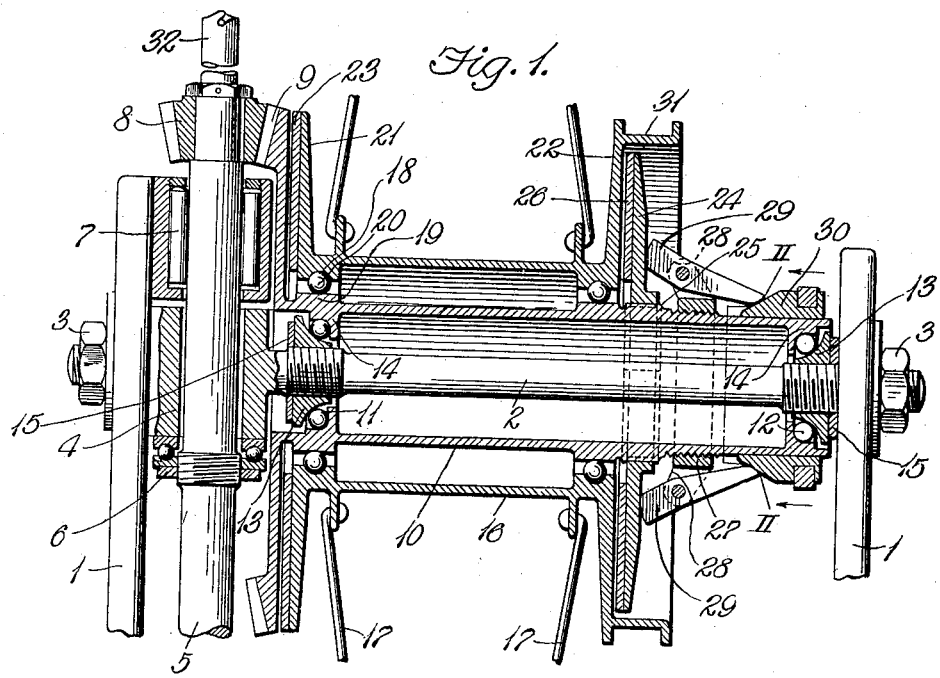
Figure 2:
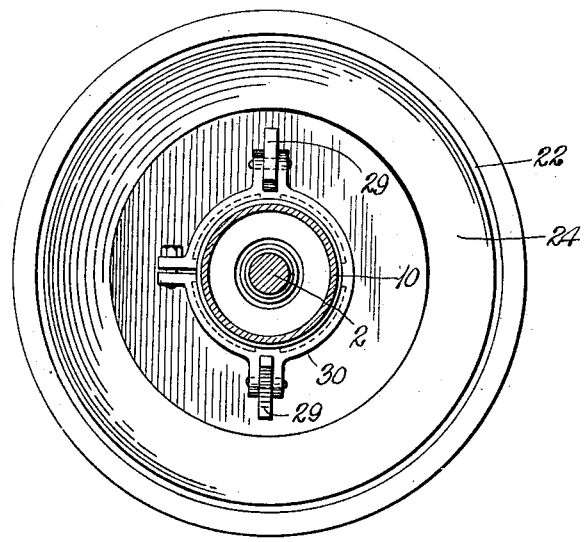

To these ends the invention consists in the matters hereinafter set forth and more particularly pointed out in the appended claims reference being had to the accompanying drawings in which, Figure 1 is a longitudinal section through a hub embodying the invention; and Fig. 2 is a transverse section of the same on the line II—II of Fig. 1.

In Fig. 1 of the drawing frame members 1 of the usual construction extend rearwardly at each side of the driving wheel of the motor cycle and are rigidly secured to the ends of a fixed shaft 2 by means of nuts 3 on the screwthreaded outer ends of the shaft. Near one end the shaft 2 is provided with an enlargement or head 4 having a transverse opening therein for a driving shaft 5 which is actuated in any suitable manner as by a motor (not shown). A suitable thrust bearing 6 is interposed between a collar having screwthreaded connection with the shaft, and the forward end of the head 4 and adjacent to the rear end of the head, the shaft 5 is supported within a suitable roller bearing 7 which is secured to the rear end of the frame member 1. Adjacent to the roller bearing 7 upon the extreme rear end of the shaft 5, a pinion 8 is fixed in any suitable manner to transmit motion from the shaft to a beveled gear 9 which is in mesh therewith. This beveled gear is formed integral with one end of a bearing sleeve 10 or said gear may be formed of a separate piece secured to the end of the sleeve if it is found desirable to make it in a manner other than an integral part of the sleeve. Bearings 11 and 12 are interposed between the ends of the sleeve and the shaft 2, said bearings each comprising a cone 13 adjustably mounted upon the shaft in the usual manner and balls interposed between said cones and suitable ball races 14 on the sleeve. Lock nuts 15 on the shaft are provided to hold the cones in the position to which they are adjusted so that the sleeve may turn freely upon the fixed shaft or axle 2.

Surrounding the sleeve 10 is a tubular wheel hub 16 to which the wire spokes 17 of the wheel are attached in the usual manner. This hub is supported on the sleeve to turn freely thereon by means of ball bearings 18 each comprising a bearing member 19 on the sleeve forming a flat bearing surface to be engaged by the series of balls 20 which is interposed between said surface and a suitable ball race on the hub of the wheel.

The ends of the hub are formed or otherwise provided with outwardly extending flanges 21 and 22, the flange 21 extending outwardly adjacent to the inner side face of the beveled gear 9, said side of said gear being faced off to engage a friction ring 23 of fiber or other suitable material secured to or supported against the outer face of the flange 21 on the hub. Mounted upon the sleeve 10 adjacent to the outer face of the flange 22 is a friction disk or ring 24, said disk being free to slide longitudinally of the sleeve and being operatively connected to the sleeve to turn therewith by ribs 25 on the sleeve engaging notches in the disk. Interposed between the side face of the disk 24 and an outer friction surface of the flange 22 is a ring of fiber or other suitable material 26 supported against the face of the disk, and adjustably secured upon the outer end of the sleeve 10 is a split ring 27 having screwthreaded engagement with the sleeve and provided with outwardly extending ears 28 between which are pivoted dogs 29 with one end in position to engage the outer side of the disk 24 and their opposite ends engaged by a cone member 30 slidable longitudinally upon the outer end of the sleeve 10. The cone member is moved toward and from the disk 24 upon the sleeve in any suitable manner (not shown) to engage the outer ends of the dogs and turn the same upon their pivots, thus forcing the ring 26 on the disk 24 into frictional engagement with the flange 22 and at the same time moving the sleeve 10 and hub 16 relatively in a longitudinal direction to bring the ring 23 carried by the flange 21 into frictional engagement with the friction surface of the gear 9. The flange 22 may, if found desirable, be provided with a laterally extending peripheral flange 31 adapted to be engaged by a suitable brake band (not shown), and the rear end of the driving shaft is preferably extended as at 32 and formed for engagement with a suitable starting crank (not shown) for starting the engine.

When the parts are in the position shown in Fig. 1, the wheel hub is free to turn upon the bearings 18 around the sleeve 10 and the sleeve 10 is also perfectly free to turn within the hub upon the bearings 11 and 12 around the fixed angle 2. The motor cycle may, therefore, be pushed along the ground without motion being transmitted from the driving wheel to the engine and when the machine is at rest, the engine may be started and the sleeve rotated without transmitting power to the driving wheel. When the cone member 30 is moved to actuate the dogs, the friction surfaces are brought gradually into contact and thus the application of the power of the engine to the driving wheel is gradual and the jerking, uneven starting of the vehicle is prevented. The particular arrangement of friction members gives a large frictional area which prevents slipping and consequent wear and the arrangement is such that the strain of the force supplied to bring the parts into frictional engagement is taken in the direction of the length of the hub and sleeve so that no damage to the parts can result therefrom. The particular arrangement of driving shaft permits the rearward extension thereof so that a crank may be applied directly thereto for starting the engine.

Obviously other means for driving the sleeve may be employed than the driving shaft and beveled gears shown, and other changes in the construction and arrangement of parts may be made without departing from the spirit of my invention. I do not therefore limit myself to the particular form or construction shown.

Having thus fully described my invention what I claim is:

1. In a driving hub, the combination with a driven shaft, of a stationary shaft extending at right angles thereto, an inner member revolubly mounted upon said stationary shaft and adapted to have an end thereof driven by said driven shaft, a hub member revolubly mounted upon said inner member capable of longitudinal movement thereon and having friction members with one of said friction members located to frictionally engage the driven end of said inner member, and the other friction member adapted to engage the other friction member of said hub member to lock said hub member for rotation with said inner member.

2. The combination of a tubular hub, outwardly extending flanges on the ends of said hub, frame members at the ends of the hub, a fixed axle connecting the frame members and extending through the hub, a sleeve extending through the hub and surrounding the fixed axle, bearings interposed between the fixed axle and sleeve, bearings interposed between the sleeve and hub, a friction member upon one end of the sleeve to oppose the flange on one end of the hub, a friction disk movable longitudinally upon the sleeve and operatively connected thereto to turn therewith, said disk being arranged to oppose the flange upon the opposite end of the hub, means for applying power to turn the sleeve, and means for moving the disk longitudinally upon the sleeve.

3. The combination of frame members, a fixed axle connecting said members, a sleeve upon the fixed axle, bearings interposed between the sleeve and axle, a friction member extending outwardly from one end of the sleeve, means for applying power to the friction member to turn the sleeve, a tubular hub surrounding the sleeve, bearings interposed between the sleeve and hub, an outwardly extending flange upon one end of the hub to oppose the friction member on the sleeve, an outwardly extending flange on the opposite end of the hub, a friction disk mounted upon the sleeve to oppose said flange, said disk being movable longitudinally upon the sleeve and operatively connected thereto to turn therewith, and means adjustable upon the sleeve toward and from the disk to engage and move the disk toward the hub and move the sleeve and hub relatively in a longitudinal direction.

4. The combination of side frame members, a fixed axle connecting said members and having an enlargement near one end formed with a transverse opening, a sleeve upon the fixed axle, anti-friction bearings interposed between the sleeve and axle, a friction member on one end of the sleeve formed with a friction side surface at the inner side thereof and gear teeth at its periphery, a driving shaft extending through the opening in the enlargement of the axle, a beveled pinion on the rear end of the driving shaft to engage the gear teeth of the friction member on the sleeve, a tubular hub through which the sleeve extends, anti-friction bearings between the sleeve and hub, an outwardly extending flange on the end of the hub adjacent to the friction member on the sleeve, an outwardly extending flange on the opposite end of the hub, a friction disk on the sleeve to oppose said flange and movable longitudinally upon and operatively connected to the sleeve to turn therewith, a ring adjustably secured to the sleeve adjacent to the outer side of the disk, dogs pivotally attached to said ring to engage and move the disk longitudinally upon the sleeve, and a member slidable upon the sleeve to engage and operate the dogs.

5. The combination of side frame members, a fixed axle secured at its ends to said members and formed with an enlargement near one end having a transverse opening therethrough, a sleeve upon the axle, ball bearings interposed between the axle and sleeve a beveled gear on one end of the sleeve having a side face forming a friction surface, a driving shaft extending through the opening in the axle, a bearing on the adjacent frame member for said shaft, a thrust bearing on the shaft engaging the enlargement of the axle, a beveled pinion on the rear end of the shaft in engagement with the gear, a tubular hub through which the sleeve extends an outwardly extending flange on one end of the hub, a friction ring interposed between said flange and the friction surface of the gear, ball bearings interposed between the hub and sleeve, an outwardly extending flange on the opposite end of the hub, a laterally extending flange on said outwardly extending flange forming a friction surface for a brake, a friction disk movable longitudinally upon the sleeve operatively connected thereto to turn therewith, a friction ring interposed between the disk and the adjacent flange on the hub, an adjustable ring on the sleeve, dogs pivotally attached to said ring in engagement with the friction disk, and a cone member movable longitudinally on the sleeve into engagement with the dogs to operate the same.

In testimony whereof I affix my signature in presence of two witnesses.

JOSHUA A. HILL.

Witnesses:
LEWIS E. FLANDERS,
ANNA M. DORR.

Copies of this patent may be obtained for five cents each, by addressing the "Commissioner of Patents, Washington, D. C."